US012668516B2

(12) United States Patent
Campbell et al.

(10) Patent No.: US 12,668,516 B2
(45) Date of Patent: Jun. 30, 2026

(54) SYSTEM AND METHOD FOR USING ULTRAMICROPOROUS CARBON FOR THE SELECTIVE REMOVAL OF NITRATE WITH CAPACITIVE DEIONIZATION

(71) Applicant: Lawrence Livermore National Security, LLC, Livermore, CA (US)

(72) Inventors: Patrick Campbell, Oakland, CA (US); Maira Ceron Hernandez, Brentwood, CA (US); Steven Hawks, Livermore, CA (US); Colin Loeb, Fairfield, CA (US); Tuan Anh Pham, Livermore, CA (US); Michael Stadermann, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 675 days.

(21) Appl. No.: 17/733,860

(22) Filed: Apr. 29, 2022

(65) Prior Publication Data

US 2022/0250954 A1 Aug. 11, 2022

Related U.S. Application Data

(62) Division of application No. 16/268,154, filed on Feb. 5, 2019, now Pat. No. 11,358,883.

(51) Int. Cl.
| | |
|---|---|
| *C01B 32/05* | (2017.01) |
| *B01D 61/42* | (2006.01) |
| *B01J 13/00* | (2006.01) |
| *C01B 32/318* | (2017.01) |
| *C01B 32/336* | (2017.01) |
| *C02F 1/469* | (2023.01) |
| *C02F 101/16* | (2006.01) |

(52) U.S. Cl.
CPC .......... C02F 1/4691 (2013.01); B01D 61/428 (2022.08); B01J 13/0026 (2013.01); B01J 13/0091 (2013.01); C01B 32/05 (2017.08); C01B 32/318 (2017.08); C01B 32/336 (2017.08); *C01P 2004/02* (2013.01); *C01P 2006/40* (2013.01); *C02F 2101/163* (2013.01)

(58) Field of Classification Search
CPC ..... C01F 1/4691; C01B 32/318; C01B 32/05; C01B 32/336; B01D 61/428; B01J 13/0026; B01J 13/0091; C01P 2004/02; C01P 2006/40; C02F 2101/163
See application file for complete search history.

(56) References Cited

U.S. PATENT DOCUMENTS

| | | | |
|---|---|---|---|
| 5,538,611 A | 7/1996 | Otowa | |
| 5,547,581 A | 8/1996 | Andelman | |
| 6,462,935 B1 | 10/2002 | Shiue et al. | |
| 7,632,406 B2 | 12/2009 | Wilson et al. | |
| 8,685,287 B2 | 4/2014 | Worsley et al. | |
| D787,835 S | 5/2017 | Lim | |
| 2003/0098266 A1 | 5/2003 | Shiue et al. | |
| 2004/0188246 A1 | 9/2004 | Tran et al. | |
| 2008/0073288 A1 | 3/2008 | Fan et al. | |
| 2008/0105551 A1 | 5/2008 | Wang et al. | |
| 2009/0294289 A1 | 12/2009 | Haslam et al. | |
| 2010/0190639 A1 | 7/2010 | Worsley et al. | |
| 2011/0240472 A1 | 10/2011 | Seed et al. | |
| 2011/0247937 A1 | 10/2011 | Suh et al. | |
| 2011/0311855 A1 | 12/2011 | Peng et al. | |
| 2012/0234695 A1 | 9/2012 | Mayes et al. | |
| 2012/0273359 A1 | 11/2012 | Suss et al. | |
| 2013/0004761 A1 | 1/2013 | Worsley et al. | |
| 2014/0202880 A1 | 7/2014 | Suss et al. | |
| 2015/0041708 A1* | 2/2015 | Wiesner ............... C01B 32/336 |
| | | | 252/182.1 |
| 2016/0280569 A1 | 9/2016 | Yeung et al. | |
| 2017/0144902 A1 | 5/2017 | Stadermann et al. | |
| 2017/0166451 A1 | 6/2017 | Horiguchi et al. | |
| 2017/0200566 A1 | 7/2017 | Stadermann et al. | |
| 2019/0259546 A1* | 8/2019 | Kron ...................... H01G 11/34 |

FOREIGN PATENT DOCUMENTS

| | | |
|---|---|---|
| KR | 100973669 B1 | 8/2010 |
| WO | WO-0166217 A1 | 9/2001 |
| WO | WO-0190443 A1 | 11/2001 |
| WO | WO-2010014615 A1 | 2/2010 |
| WO | WO-2012148709 A3 | 1/2013 |

OTHER PUBLICATIONS

"Conductor" dictionary entry. http:www/dictionary.com/browse/lead. Retrieved Jul. 21, 2017.
"Electrode" dictionary entry. http://www.dictionary.com/browse/lead. Retrieved Jul. 21, 2017.
"Lead" dictionary entry. http://www.dictionary.com/browse/lead. Retrieved Jul. 21, 2017.
Baumann, T. F.; Worsley, M. A.; Han, T. Y.-J.; Satcher, J. H. High Surface Area Carbon Aerogel Monoliths with Hierarchical Porosity. J. Non-Cryst. Solids 2008, 354 (29), 3513-3515.
Biener, J.; Dasgupta, S.; Shao, L.; Wang, D.; Worsley, M. A.; Wittstock, A.; Lee, J. R. I.; Biener, M. M.; Orme, C. A.; Kucheyev, S. O.; Wood, B. C.; Willey, T. M.; Hamza, A. V.; Weissmüller, J.; Hahn, H.; Baumann, T. F. Macroscopic 3D Nanographene with Dynamically Tunable Bulk Properties. Adv. Mater. 2012, 24 (37), 5083-5087.

(Continued)

*Primary Examiner* — Stuart L Hendrickson
(74) *Attorney, Agent, or Firm* — HARNESS, DICKEY & PIERCE PLC

(57) ABSTRACT

The present disclosure relates to a method for making a carbon aerogel electrode material. The method involves initially making a wet organic sol-gel form. The sol-gel form is carbonized at a temperature of from about 900° C. to about 1000° C., for from about 2 hours to about 4 hours. The carbonized sol-gel is then activated under carbon dioxide flow, for from about 0.5 hour to about 1.5 hours, at from about 900° C. to about 1000° C.

4 Claims, 7 Drawing Sheets

(56) References Cited

OTHER PUBLICATIONS

Biesheuvel, P. M.; Bazant, M. Z.; Cusick, R. D.; Hatton, T. A.; Hatzell, K. B.; Hatzell, M. C.; Liang, P.; Lin, S.; Porada, S.; Santiago, J.G.; Smith, K. C.; Stadermann, M.; Su, X.; Sun, X.; Waite, T. D.; van der Wal, A.; Yoon, J.; Zhao, R.; Zou, L.; Suss, M. E. Capacitive Deionization—Defining a Class of Desalination Technologies. Phys. Appl. Phys. 2017, 1-3.

Dubinin, M.; Stoeckli, H. Homogeneous and Heterogeneous Micropore Structures in Carbonaceous Adsorbents. J. Colloid Interface Sci. 1980, 75 (1), 34-42.

Dykstra, J. E.; Dijkstra, J.; Van der Wal, A.; Hamelers, H. V. M.; Porada, S. On-Line Method to Study Dynamics of Ion Adsorption from Mixtures of Salts in Capacitive Deionization. Desalination 2016, 390, 47-52.

Eliad, L.; Salitra, G.; Soffer, A.; Aurbach, D. Ion Sieving Effects in the Electrical Double Layer of Porous Carbon Electrodes: Estimating Effective Ion Size in Electrolytic Solutions. J. Phys. Chem. B 2001, 105 (29), 6880-6887.

Everett, D. H.; Powl, J. C. Adsorption in Slit-like and Cylindrical Micropores in the Henry's Law Region. A Model for the Microporosity of Carbons. J. Chem. Soc., Faraday Trans. 1 1976, 72, 619.

Farmer et al., "Capacitive Deionization of NaCl and NaNO3 Solutions with Carbon Aerogel Electrodes", Journal of the Electrochemical Society, vol. 143, No. 1, 1996.

Gabelich, C. J.; Tran, T. D.; Suffet, I. H. ya"Mel." Electrosorption of Inorganic Salts from Aqueous Solution Using Carbon Aerogels. Environ. Sci. Technol. 2002, 36 (13), 3010-3019.

Guyes, E. N.; Shocron, A. N.; Simanovski, A.; Biesheuvel, P. M.; Suss, M. E. A One-Dimensional Model for Water Desalination by Flow-through Electrode Capacitive Deionization. Desalination 2017, 415, 8-13.

Gygi, F. Architecture of Qbox: A Scalable First-Principles Molecular Dynamics Code. IBM J. Res. Dev. 2008, 52, 137-144.

Hassanvand, A.; Chen, G. Q.; Webley, P. A.; Kentish, S. E. A Comparison of Multicomponent Electrosorption in Capacitive Deionization and Membrane Capacitive Deionization. Water Res. 2018, 131, 100-109.

Hawks, S. A.; Knipe, J. M.; Campbell, P. G.; Loeb, C. K.; Hubert, M. A.; Santiago, J. G.; Stadermann, M. Quantifying the Flow Efficiency in Constant-Current Capacitive Deionization. Water Res. 2018, 129, 327-336.

Hawks, S. A.; Ramachandran, A.; Porada, S.; Campbell, P. G.; Suss, M. E.; Biesheuvel, P. M.; Santiago, J. G.; Stadermann, M. Performance Metrics for the Objective Assessment of Capacitive Deionization Systems. Water Res. 2019, 152, 126.

Hawks, Steven A. et al. Using Ultramicroporous Carbon for the Selective Removal of Nitrate with Capacitive Deionization, Environ. Sci. Technol., 2019, 53, 10863-10870.

Hemmatifar, A.; Palko, J. W.; Stadermann, M.; Santiago, J. G. equency Analysis and Resonant Operation for Efficient Capacitive Deionization. Water Res. 2016, 104, 303-311.

Hemmatifar, A.; Ramachandran, A.; Liu, K.; Oyarzun, D. I.; Bazant, M. Z.; Santiago, J. G. Thermodynamics of Ion Separation by Electrosorption. Environ. Sci. Technol. 2018, 52, 10196.

Hou, C.-H.; Taboada-Serrano, P.; Yiacoumi, S.; Tsouris, C. Electrosorption Selectivity of Ions from Mixtures of Electrolytes inside Nanopores. J. Chem. Phys. 2008, 129 (22), 224703.

Hou, Chia-Hung et al. A comparative study of electrosorption selectivity of ions by activated carbon electrodes in capacitive deionization. Desalination 2013, 314, 124-129.

Iiyama, T.; Nishikawa, K.; Otowa, T.; Kaneko, K. An Ordered Water Molecular Assembly Structure in a Slit-Shaped Carbon Nanospace. J. Phys. Chem. 1995, 99 (25), 10075-10076.

Jagiello, J.; Ania, C.; Parra, J. B.; Cook, C. Dual Gas Analysis of Microporous Carbons Using 2D-NLDFT Heterogeneous Surface Model and Combined Adsorption Data of N2 and CO2. Carbon 2015, 91, 330-337.

Jagiello, J.; Kenvin, J. Consistency of Carbon Nanopore Characteristics Derived from Adsorption of Simple Gases and 2DNLDFT Models. Advantages of Using Adsorption Isotherms of Oxygen (O2) at 77 K. J. Colloid Interface Sci. 2019, 542, 151-158.

Kalluri, R. K.; Biener, M. M.; Suss, M. E.; Merrill, M. D.; Stadermann, M.; Santiago, J. G.; Baumann, T. F.; Biener, J.; Striolo, A. Unraveling the Potential and Pore-Size Dependent Capacitance of Slit-Shaped Graphitic Carbon Pores in Aqueous Electrolytes. Phys. Chem. Chem. Phys. 2013, 15 (7), 2309.

Kaminski, G. A.; Friesner, R. A.; Tirado-Rives, J.; Jorgensen, W. L. Evaluation and Reparametrization of the OPLS-AA Force Field for Proteins via Comparison with Accurate Quantum Chemical Calculations on Peptides. J. Phys. Chem. B 2001, 105 (28), 6474-6487.

Kim, Y.-J.; Choi, J.-H. Selective Removal of Nitrate Ion Using a Novel Composite Carbon Electrode in Capacitive Deionization. Water Res. 2012, 46 (18), 6033-6039.

Kim, Y.-J.; Kim, J.-H.; Choi, J.-H. Selective Removal of Nitrate Ions by Controlling the Applied Current in Membrane Capacitive Deionization (MCDI). J. Membr. Sci. 2013, 429, 52-57.

Kleszyk, P.; Ratajczak, P.; Skowron, P.; Jagiello, J.; Abbas, Q.; Frackowiak, E.; Béguin, F. Carbons with Narrow Pore Size Distribution Prepared by Simultaneous Carbonization and Self-Activation of Tobacco Stems and Their Application to Supercapacitors. Carbon 2015, 81 (1), 148-157.

Koresh, J.; Soffer, A. Study of Molecular Sieve Carbons. Part 1.—Pore Structure, Gradual Pore Opening and Mechanism of Molecular Sieving. J. Chem. Soc., Faraday Trans. 1 1980, 76 (2), 2457.

Lado, J. J.; Pérez-Roa, R. E.; Wouters, J. J.; Tejedor-Tejedor, M. I.; Federspill, C.; Ortiz, J. M.; Anderson, M. A. Removal of Nitrate by Asymmetric Capacitive Deionization. Sep. Purif. Technol. 2017, 183, 145-152.

Lastoskie, C.; Gubbins, K. E.; Quirke, N. Pore Size Distribution Analysis of Microporous Carbons: A Density Functional Theory Approach. J. Phys. Chem. 1993, 97 (18), 4786-4796.

Levi, M. D.; Levy, N.; Sigalov, S.; Salitra, G.; Aurbach, D.; Maier, J. Electrochemical Quartz Crystal Microbalance (EQCM) Studies of Ions and Solvents Insertion into Highly Porous Activated Carbons. J. Am. Chem. Soc. 2010, 132 (38), 13220-13222.

Lewicki, James P. et al. On the synthesis and structure of resorcinol-formaldehyde polymeric networks—Precursors to 3D-carbon macroassemblies, Polymer 69 (2015) pp. 45-51.

Li, Y.; Zhang, C.; Jiang, Y.; Wang, T. J.; Wang, H. Effects of the Hydration Ratio on the Electrosorption Selectivity of Ions during Capacitive Deionization. Desalination 2016, 399, 171-177.

Lin, R.; Taberna, P. L.; Chmiola, J.; Guay, D.; Gogotsi, Y.; Simon, P. Microelectrode Study of Pore Size, Ion Size, and Solvent Effects on the Charge/Discharge Behavior of Microporous Carbons for Electrical Double-Layer Capacitors. J. Electrochem. Soc. 2009, 156 (1), A7.

Lorrmann, V.; Reichenauer, G.; Weber, C.; Pflaum, J. Electrochemical Double-Layer Charging of Ultramicroporous Synthetic Carbons in Aqueous Electrolytes. Electrochim. Acta 2012, 86, 232-240.

Lozano-Castelló, D.; Cazorla-Amorós, D.; Linares-Solano, A. Usefulness of CO2 Adsorption at 273 K for the Characterization of Porous Carbons. Carbon 2004, 42 (7), 1233-1242.

Marcus, Y. Effect of Ions on the Structure of Water: Structure Making and Breaking. Chem. Rev. 2009, 109 (3), 1346-1370.

Marcus, Y. Thermodynamics of Solvation of Ions. Part 5.—Gibbs Free Energy of Hydration at 298.15 K. J. Chem. Soc., Faraday Trans. 1991, 87 (18), 2995-2999.

Nie, Chunyang, et al. "Electrophoretic deposition of carbon nanotubes film electrodes for capacitive deionization." Journal of Electroanalytical Chemistry, 666 (2012), pp. 85-88.

Nishihara, S.; Otani, M. Hybrid Solvation Models for Bulk, Interface, and Membrane: Reference Interaction Site Methods Coupled with Density Functional Theory. Phys. Rev. B: Condens. Matter Mater. Phys. 2017, 96 (11), 115429.

Noked, Malachi et al. "Development of Anion Steroselective, Activated Carbon Molecular Sieve Electrodes", J. Phys. chem. C. 2009, 113, 7316-7321.

Oyarzun, D. I.; Hemmatifar, A.; Palko, J. W.; Stadermann, M.; Santiago, J. G. Adsorption and Capacitive Regeneration of Nitrate

(56) References Cited

OTHER PUBLICATIONS

Using Inverted Capacitive Deionization with Surfactant Functionalized Carbon Electrodes. Sep. Purif. Technol. 2018, 194, 410-415.

Oyarzun, D. I.; Hemmatifar, A.; Palko, J. W.; Stadermann, M.; Santiago, J. G. Ion Selectivity in Capacitive Deionization with Functionalized Electrode: Theory and Experimental Validation. Water Res. X 2018, 1, 100008.

Palko, J. W.; Oyarzun, D. I.; Ha, B.; Stadermann, M.; Santiago, J. G. Nitrate Removal from Water Using Electrostatic Regeneration of Functionalized Adsorbent. Chem. Eng. J. 2018, 334, 1289-1296.

Pawlowicz, R. Calculating the Conductivity of Natural Waters. Limnol. Oceanogr.: Methods 2008, 6 (9), 489-501.

Perdew, J. P.; Burke, K.; Ernzerhof, M. Generalized Gradient Approximation Made Simple. Phys. Rev. Lett. 1996, 77 (18), 3865-3868.

Pham, T. A.; Mortuza, S. M. G.; Wood, B. C.; Lau, E. Y.; Ogitsu, T.; Buchsbaum, S. F.; Siwy, Z. S.; Fornasiero, F.; Schwegler, E. Salt Solutions in Carbon Nanotubes: The Role of Cation-$\mu$ Interactions. J. Phys. Chem. C 2016, 120 (13), 7332-7338.

Pham, T. A.; Ogitsu, T.; Lau, E. Y.; Schwegler, E. Structure and Dynamics of Aqueous Solutions from PBE-Based First-Principles Molecular Dynamics Simulations. J. Chem. Phys. 2016, 145 (15), 154501.

Porada, S.; Zhao, R.; van der Wal, A.; Presser, V.; Biesheuvel, P. M. M Review. Prog. Mater. Sci. 2013, 58 (8), 1388-1442.

Ramachandran, A.; Hawks, S. A.; Stadermann, M.; Santiago, J. G. equency Analysis and Resonant Operation for Efficient Capacitive Deionization. Water Res. 2018, 144, 581-591.

Ramachandran, A.; Hemmatifar, A.; Hawks, S. A.; Stadermann, M.; Santiago, J. G. G Self. Water Res. 2018, 140, 323-334.

Salitra, G.; Soffer, A.; Eliad, L.; Cohen, Y.; Aurbach, D. Carbon Electrodes for Double-Layer Capacitors I. Relations Between Ion and Pore Dimensions. J. Electrochem. Soc. 2000, 147 (7), 2486.

Schlipf, M.; Gygi, F. Optimization Algorithm for the Generation of ONCV Pseudopotentials. Comput. Phys. Commun. 2015, 196, 36-44.

Segalini, J.; Daffos, B.; Taberna, P. L.; Gogotsi, Y.; Simon, P. Qualitative Electrochemical Impedance Spectroscopy Study of Ion Transport into Sub-Nanometer Carbon Pores in Electrochemical Double Layer Capacitor Electrodes. Electrochim. Acta 2010, 55 (25), 7489-7494.

Seo, S. J.; Jeon, H.; Lee, J. K.; Kim, G. Y.; Park, D.; Nojima, H.; Lee, J.; Moon, S. H. Investigation on Removal of Hardness Ions by Capacitive Deionization (CDI) for Water Softening Applications. Water Res. 2010, 44 (7), 2267-2275.

Shapira, B.; Avraham, E.; Aurbach, D. Proton-Selective Electrode for PH Sensing. Electrochem. Commun. 2016, 73, 80-84.

Shilina, Y.; Levi, M. D.; Dargel, V.; Aurbach, D.; Zavorine, S.; Nucciarone, D.; Humeniuk, M.; Halalay, I. C. Ion Size to Pore Width Ratio as a Factor That Determines the Electrochemical Stability Window of Activated Carbon Electrodes. J. Electrochem. Soc. 2013, 160 (4), A629-A635.

Sigalov, S.; Levi, M. D.; Salitra, G.; Aurbach, D.; Jänes, A.; Lust, E.; Halalay, I. C. Selective Adsorption of Multivalent Ions into TiCDerived Nanoporous Carbon. Carbon 2012, 50 (10), 3957-3960.

Song, J.; Ma, J.; Zhang, C.; He, C.; Waite, T. D. Implication of Non-Electrostatic Contribution to Deionization in Flow-Electrode CDI: Case Study of Nitrate Removal From Contaminated Source Waters. Front. Chem. 2019, 7, DOI: 10.3389/fchem.2019.00146.

Steven A. Hawks, Maira R. Cerón, Diego I. Oyarzun, Tuan Anh Pham, Cheng Zhan, Colin K. Loeb, Daniel Mew, Amanda Deinhart, Brandon C. Wood, Juan G. Santiago, Michael Stadermann, and Patrick G. Campbell Environmental Science & Technology 2019 53 (18), 10863-10870 DOI: 10.1021/acs.est.9b01374.

Su, X.; Tan, K.-J.; Elbert, J.; Rüttiger, C.; Gallei, M.; Jamison, T. F.; Hatton, T. A. Asymmetric Faradaic Systems for Selective Electrochemical Separations. Energy Environ. Sci. 2017, 10 (5), 1272-1283.

Suss, M. E. Size-Based Ion Selectivity of Micropore Electric Double Layers in Capacitive Deionization Electrodes. J. Electrochem. Soc. 2017, 164 (9), E270-E275.

Suss, M. E.; Baumann, T. F.; Bourcier, W. L.; Spadaccini, C. M.; Rose, K. A.; Santiago, J. G.; Stadermann, M. Capacitive Desalination with Flow-through Electrodes. Energy Environ. Sci. 2012, 5 (11), 9511.

Suss, M. E.; Baumann, T. F.; Worsley, M. A.; Rose, K. A.; Jaramillo, T. F.; Stadermann, M.; Santiago, J. G. Impedance-Based Study of Capacitive Porous Carbon Electrodes with Hierarchical and Bimodal Porosity. J. Power Sources 2013, 241, 266-273.

Suss, M. E.; Porada, S.; Sun, X.; Biesheuvel, P. M.; Yoon, J.; Presser, V. V Water. Energy Environ. Sci. 2015, 8 (8), 2296-2319.

Suss, Matthew E. et al. "Capacitive desalination with flow-through electrodes", Energy Environ. Sci., 2012, 5, 9511.

Suss, Matthew E. et al. Poster titled "Electrode flow-through capacitive desalination", Lawrence Livermore National Laboratory, Oct. 25, 2011, 1 page.

Tang, W.; Kovalsky, P.; He, D.; Waite, T. D. Fluoride and Nitrate Removal from Brackish Groundwaters by Batch-Mode Capacitive Deionization. Water Res. 2015, 84, 342-349.

Tang, W.; Liang, J.; He, D.; Gong, J.; Tang, L.; Liu, Z.; Wang, D.; Zeng, G. Various Cell Architectures of Capacitive Deionization: Recent Advances and Future Trends. Water Res. 2019, 150, 225-251.

Tansel, B. Significance of Thermodynamic and Physical Characteristics on Permeation of Ions during Membrane Separation: Hydrated Radius, Hydration Free Energy and Viscous Effects. Sep. Purif. Technol. 2012, 86, 119-126.

Tansel, B.; Sager, J.; Rector, T.; Garland, J.; Strayer, R. F.; Levine, L.; Roberts, M.; Hummerick, M.; Bauer, J. Significance of Hydrated Radius and Hydration Shells on Ionic Permeability during Nanofiltration in Dead End and Cross Flow Modes. Sep. Purif. Technol. 2006, 51 (1), 40-47.

Thommes, M.; Kaneko, K.; Neimark, A. V.; Olivier, J. P.; Rodriguez-Reinoso, F.; Rouquerol, J.; Sing, K. S. W. Physisorption of Gases, with Special Reference to the Evaluation of Surface Area and Pore Size Distribution (IUPAC Technical Report). Pure Appl. Chem. 2015, 87 (9-10), 1051-1069.

Uzun, H. I.; Debik, E. Economical Approach to Nitrate Removal via Membrane Capacitive Deionization. Sep. Purif. Technol. 2019, 209, 776-781.

Yadav, S.; Choudhary, A.; Chandra, A. First-Principles Molecular Dynamics Study of the Solvation Shell Structure, Vibrational Spectra, Polarity, and Dynamics around a Nitrate Ion in Aqueous Solution. J. Phys. Chem. B 2017, 121 (38), 9032-9044.

Yeo, J.-H.; Choi, J.-H. Enhancement of Nitrate Removal from a Solution of Mixed Nitrate, Chloride and Sulfate Ions Using a Nitrate-Selective Carbon Electrode. Desalination 2013, 320, 10-16.

Zhang, Y.; Cremer, P. Interactions between Macromolecules and Ions: The Hofmeister Series. Curr. Opin. Chem. Biol. 2006, 10 (6), 658-663.

Zhao, R.; van Soestbergen, M.; Rijnaarts, H. H. M.; van der Wal, A.; Bazant, M. Z.; Biesheuvel, P. M. Time-Dependent Ion Selectivity in Capacitive Charging of Porous Electrodes. J. Colloid Interface Sci. 2012, 384 (1), 38-44.

* cited by examiner

SEM Micrographs of cross section of µHCAM electrodes after carbonization and activation at low magnification SEM Micrographs of cross section of µHCAM electrodes after carbonization and activation at high magnification

SYSTEM AND METHOD FOR USING ULTRAMICROPOROUS CARBON FOR THE SELECTIVE REMOVAL OF NITRATE WITH CAPACITIVE DEIONIZATION

CROSS-REFERENCE TO RELATED APPLICATIONS

This application is a divisional of and claims priority to U.S. patent application Ser. No. 16/268,154 filed on Feb. 5, 2019 (now allowed). The disclosure of the above application is incorporated herein by reference.

FEDERALLY SPONSORED RESEARCH OR DEVELOPMENT

This invention was made with Government support under Contract No. DE-AC52-07NA27344 awarded by the United States Department of Energy. The Government has certain rights in the invention.

FIELD

The present disclosure relates to capacitive desalination systems and methods, and more particularly to systems and methods for flow through electrode, capacitive deionization (FTE-CDI) which incorporate a new electrode construction for effectively removing nitrate from a mixture of ions in fluid (water) flowing through the system.

BACKGROUND

The statements in this section merely provide background information related to the present disclosure and may not constitute prior art.

The current state-of-the-art for water desalination is reverse osmosis (RO). Reverse osmosis uses membranes that allow water, but not salt, to pass through the membranes. Pressure is applied to the feed side, pushing water across the membrane to overcome membrane resistance, as well as the osmotic pressure. Energy use in RO scales with the amount of water produced. For seawater, the energy efficiency of RO is unsurpassed, however at low salt concentration the energy efficiency of RO is significantly reduced. Furthermore, RO membranes are non-selective, which means that one must remove all ions to remove a particular contaminant. This further reduces the possible efficiency of using RO to treat water for specific trace contaminants.

Capacitive deionization (GDI) is a more recently developed technology. Unlike membrane-based methods, GDI removes salt with electric fields. The charged salt ions are attracted to the charged porous electrodes and thus removed from the water. The device is operated by applying a voltage to the two spaced apart electrodes, which act like plates of a supercapacitor. While water passes through the device, salt ions are attracted to the charged surface and thus removed from the feed water. The energy cost of GDI is proportional to the amount of salt removed, thus giving it the potential to be more energy efficient than RO in low salinity regimes. Because GDI is an inherently low-pressure operation and cell and electrode components are made from low-cost materials, the capital costs are also expected to be significantly less than RO.

Flow-through electrode capacitive deionization (FTE-CDI) is a technology that involves flowing feed water to be desalinated through the porous electrodes of a capacitive deionization system, rather than between the electrodes as in a conventional GDI device. The assignee of the present application is a leader in the development of this technology, as will be appreciated from the disclosure of U.S. Patent Publication No. 2012/0273359 A1, published Nov. 1, 2012, the disclosure of which is hereby incorporated by reference into the present disclosure. In view of the known advantages of an FTE-CDI system, significant interest exists in even further enhancing and improving the capabilities of such a system to even more effectively and efficiently perform desalination on salt water and/or to remove other types of ions from water.

In addition to general salinity reduction, a particular area of interest in GDI research is the selective removal of specific ionic contaminants for increased energy efficiency and to more effectively utilize removal capacity. One of the major contaminants of interest in present day GDI research is nitrate, which is regulated by the US Environmental Protection Agency to a maximum contaminant level in drinking water of 10 mg/L (as N) or 0.7 mM as $NO_3$. The concentration of nitrate in groundwater is increasing by a reported 1-3 mg/L/yr due to a number of factors including human activities involving agriculture, for example from fertilizer runoff and disposal of municipal effluents by sludge spreading on fields. Other factors contributing to the increased concentration of nitrate found in groundwater include atmospheric emissions from energy production sources, as well as combustion engines of present day motor vehicles. Accordingly, there is a growing interest in developing systems for more effectively removing nitrates, in particular, from groundwater, making the development of effective treatment methods increasingly important.

SUMMARY

In one aspect the present disclosure relates to a flow through electrode, capacitive deionization (FTE-CDI) system. The system may comprise a pair of electrodes arranged generally parallel to one another; a water permeable dielectric arranged between the electrodes so as to be sandwiched between the electrodes; and an electronic circuit for applying a direct current voltage across the electrodes. At least one of the electrodes may be formed from a carbon material having a hierarchical pore size distribution, the hierarchical pore size distribution including a first plurality of nano-sized pores having a width of no more than about 1 nm, and a second plurality of pores having micron-sized pores that enable a flow of water to be pushed through the electrode. The first plurality of pores form adsorption sites for nitrate molecules carried in the water flowing through the at least one electrode.

In another aspect the present disclosure relates to an ultramicroporous electrode for use in a flow through, capacitive deionization (FTE-CDI) system for adsorbing nitrate molecules contained in water being fed into the electrode for treatment. The electrode may comprise a carbon aerogel member having a hierarchical pore size distribution. The hierarchical pore size distribution may include a first plurality of ultramicropores randomly distributed throughout a thickness of the carbon aerogel member, and each forming a slit having a width of no more than about 1 nm; and a second plurality of micron-sized pores randomly distributed throughout the thickness of the carbon aerogel member. The micron-sized pores are sufficiently large to enable liquid flow paths to be formed through the entire thickness of the carbon aerogel member, which enable a flow of water to be pushed through the thickness of the carbon aerogel member.

The first plurality of pores form adsorption sites for capturing nitrate molecules carried in the water flowing through the carbon aerogel member.

In still another aspect the present disclosure relates to a method for making a carbon aerogel electrode material. The method may comprise making a wet organic sol-gel form; carbonizing the sol-gel form at a temperature of from about 900° C. to about 1000° C., for from about 2 to about 4 hours; and activating the carbonized sol-gel under carbon dioxide flow, for from about 0.5 hours to about 1.5 hours, at from about 900° C. to about 1000° C.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIGS. 3a, 3b, 3a1 and 3b1 are illustrations showing the distribution of solvating water molecules around the disc-like nitrate molecule, and wherein FIG. 3a shows the XY (or equatorial) plane of nitrate, which has strongly bound water, indicated by red in the plot of FIG. 3a1, and wherein, FIG. 3b shows the ZX (or axial) plane, which has much weaker interactions with solvating water, indicated by the lack of red in the plot of FIG. 3b1, which implies that the overall shape of the solvated nitrate molecule is disc-like;

DETAILED DESCRIPTION

Figures 1, 1A:
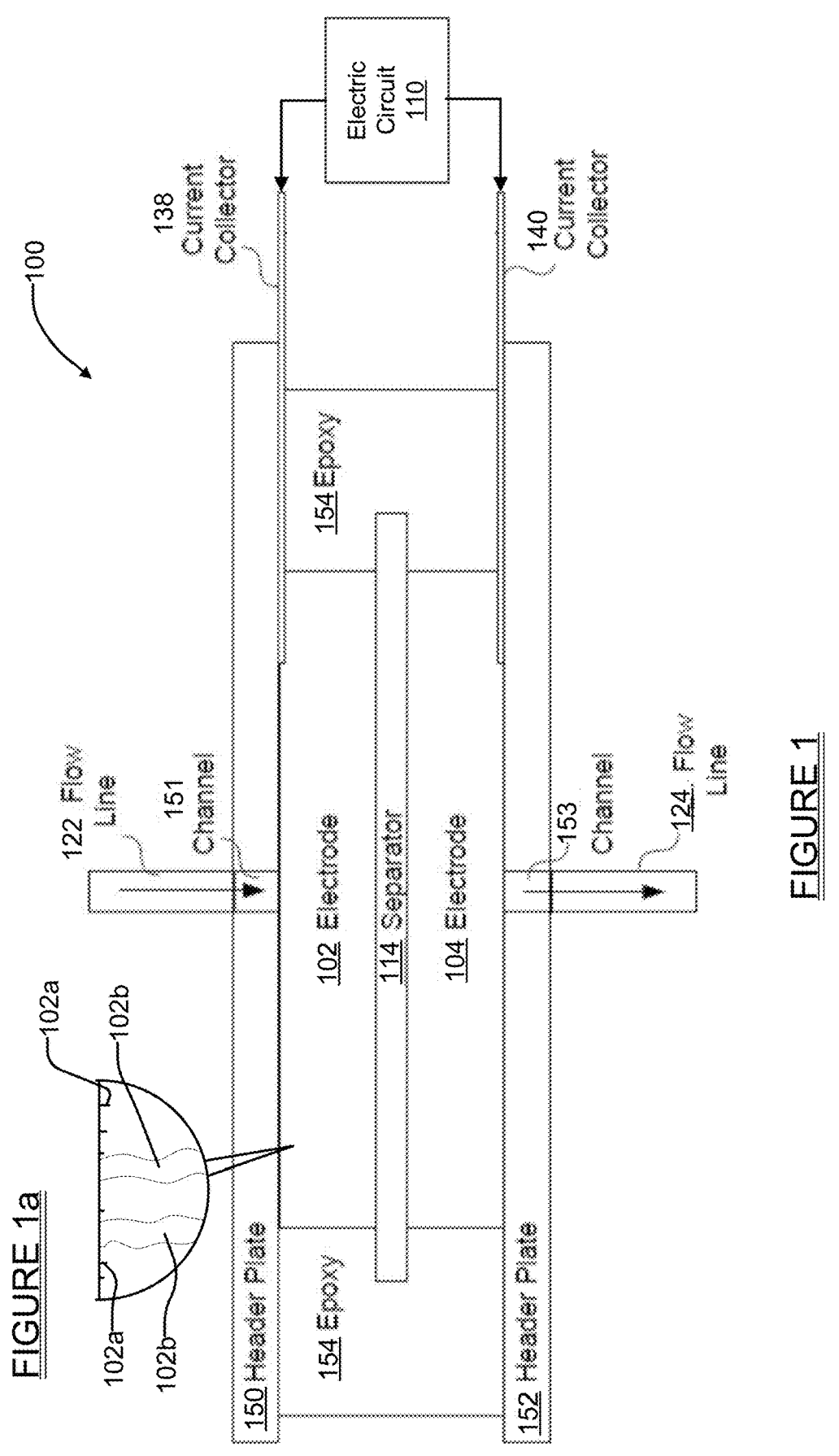
FIG. 1 is a high level block diagram of one embodiment of a FTE-CDI system in accordance with the present disclosure for removing nitrate from a flowing fluid, for example from flowing water through the system.
FIG. 1a is a highly simplified enlargement of a portion of one of the electrodes shown in FIG. 1 illustrating in a highly simplified manner the microporous (i.e., nanometer scale) pore structure and the micron-sized flow paths formed in each of the electrodes, the microporous structure being well suited for capturing nitrate contained in a flowing fluid.

The following description is merely exemplary in nature and is not intended to limit the present disclosure, application, or uses. It should be understood that throughout the drawings, corresponding reference numerals indicate like or corresponding parts and features.

The present disclosure relates to FTE-CDI systems and methods which employ a new material in a new geometry to further increase the process rate compared to the typical flow between the electrodes of a GDI system. The present system and method introduces a FTE-CDI system which uses a new carbon material ($CO_2$ activated AARF) for the electrodes of the system, described more fully in the following paragraphs, which has a hierarchical pore size distribution. The hierarchical pore size distribution includes a first plurality of sub-nanometer scale pores ("ultramicropores") to provide adsorption sites, while a second plurality of pores are included which form micron-sized pores through which water can be pushed at relevant flow rates without requiring a substantial amount of energy. This material can now be used in a different geometry: rather than passing water between the electrodes, the water is pushed through the electrodes. Instead of relying on diffusion, the salt is actively pushed into and out of the capacitor, which reduces desalination time substantially.

FIG. 1 illustrates one example of an embodiment of flow-through electrode capacitive deionization (FTE-CDI) system 100 according to the present disclosure. The FTE-CDI system 100 may be viewed as forming a single "cell" and includes a pair of electrodes 102 and 104, and an electric circuit 110 that energizes the electrodes 102 and 104. The electrode 102 contacts and electrically connects the current collector 138, which electrically connects the electrode 102 to one side of the electric circuit 110, which applies a voltage across the electrode 102. Similarly, the electrode 104 contacts and electrically connects the current collector 140, which electrically connects to the other side of the electric circuit 110. The current collectors 138 and 140 may be made of any suitable metals or metal alloys, but in one preferred implementation are made from titanium. The current collectors 138 and 140 may be foils or wires, and they may be connected to the electrodes 102 and 104 using conductive epoxy (e.g., silver epoxy) or paint (e.g., nickel paint), which is completely sealed or potted in epoxy to prevent corrosion. The electric circuit 110 applies a DC voltage across the electrodes 102 and 104, which produces an electrical field between the electrodes 102 and 104.

The electrodes 102 and 104 are arranged such that a flow of the feed water flows through the electrodes 102 and 104 and in a direction parallel to an electric field applied across the electrodes 102 and 104. While only a single pair of electrodes 102/104 is shown in FIG. 1, in practice it is anticipated that in commercial applications, the system 100 may include two or more pairs of electrodes. Also, it is anticipated that a commercial application of the system 100 will likely involve using a much larger plurality of instances of the system 100, possibly incorporating hundreds or more such pairs of electrodes 102/104, depending on device size, salt removal, and throughput considerations, and the intended application.

With further reference to FIG. 1, a water-permeable separator 114 made of an insulative material (e.g., dielectric material) may be disposed between the electrodes 102 and

104 to prevent electrical short-circuits between the electrodes 102 and 104. The separator 114 may be made of, e.g., electrolyte permeable paper or a polymer membrane (or 25 polymer membranes). In one implementation the thickness of the separator 114 may be, for example, less than about 20% of an overall thickness of each of the electrodes 102 and 104, and in one specific implementation may be on the order of no more than about 100 microns thick, and in one particularly preferred implementation the separator is about 20-50 μm thick.

Header plates 150 and 152 are disposed to sandwich the electrodes 102 and 104 and the separator 114. The header plates 150 and 152 are made of, e.g., ultraviolet (UV) transparent acrylic material.

Alternative to acrylic, other transparent plastic materials may also be used (e.g., polycarbonate). The header plates 150 provides structural support to the electrodes 102 and 104 and the separator 114.

An epoxy 154 may be disposed between the header plates 150 and 152 and surrounding the electrodes 102 and 104 and the separator 114. The epoxy 154 may be, e.g., UV-curable epoxy. The header plates 150 and 152 and the epoxy 154 define a space that accommodates the electrodes 102 and 104 and the separator 114. In some embodiments, a combination of the header plates 150 and 152, the electrodes 102 and 104, the separator 114, the current collectors 138 and 140, and the epoxy 154 is referred to as a cell (e.g., an FTE-CDI cell, or a flow through cell). Again, it will be understood that in a commercial application, a large plurality of instances of the system 100 (with the system representing one "cell") is likely to be used.

The FTE-CDI system 100 includes an input flow line 122 and an output flow line 124. In some embodiments, the input flow line 122 and the output flow line 124 are part of the system 100. In some embodiments, the system 100 may include multiple input flow lines and/or multiple output flow lines.

The header plate 150 includes one or more flow channels formed therein. For example, as shown in FIG. 1, the header plate 150 is shown to include a channel 151, although in practice it will be appreciated that a plurality of flow channels 151 may preferably be formed in the header plate 150 to distribute a fluid flow evenly through the header plate. The channel 151 of the header plate 150 is in fluidic communication with the input flow line 122 and the electrode 102. Similarly, the header plate 152 defines one or more channels 153 therein, and more preferably a plurality of spaced apart flow channels. The channel 153 of the header plate 152 is in fluidic communication with the output flow line 124 and the electrode 104.

Because the space accommodating the electrodes 102 and 104 and the separator 104 is sealed by the epoxy 154, water can only flow into and out of the cell through the flow lines 122 and 124. Thus, during operation, water flow into the FTE-CDI system 100 through the input flow line 122, the channel 151 of the header plate 150 (or multiple channels), the electrode 102, the separator 114, the electrode 104, the channel 153 of the header plate 152 (or multiple channels), and the output flow line 124.

In operation during a charging stage, as the water flows through the electrodes 102 and 104, ions from the water are attracted to the electrodes 102 and 104 and adsorb to the surfaces of the porous electrodes 102 and 104. During a discharging stage, to avoid ion saturation on the electrodes 102 and 104, the electrodes 102 and 104 are short-circuited or applied with a reverse electrical potential difference (e.g., by the electric circuit 110). As a result, ions previously adsorbed on the electrode surfaces are flushed into waste water flowing through the electrodes 102 and 104.

Electrode Construction

The electrodes 102 and 104 of the system 100 are new and effectively work to capture nitrate molecules from fluids (e.g., water) flowing through the electrodes. As shown in highly simplified representative form in FIG. 1*a*, each electrode 102 and 104 forms an ultramicroporous electrode (e.g., carbon aerogel). The terms "ultramicroporous" and "ultramicropores", as used herein, mean a quantity of pores which are all below, or substantially all below, about 1 nm in width. These ultramicropores are designated by reference number 102*a* in FIG. 1*a*, and are distributed randomly throughout each electrode 102 and 104. In addition, micron-sized flow paths, indicated by reference number 102*b* in FIG. 1*a* for the electrode 102, are formed with a random distribution throughout the electrode 102, and extend through the entire cross section of the electrode 102. With brief reference to FIGS. 4*a* and 4*b*, the micron-sized pores 102*b* form a ligament structure throughout the thickness of the electrode 102. The ultramicropores 102*a* are present on the ligaments, so they are essentially uniformly distributed through the thickness of the electrode 102. Electrode 104 may be formed in an identical manner to also include both the ultramicropores 102*a* and the micron-sized pores 102*b*. Only the micron-sized pores allow flow through the thickness of the electrode 102.

Figure 2:
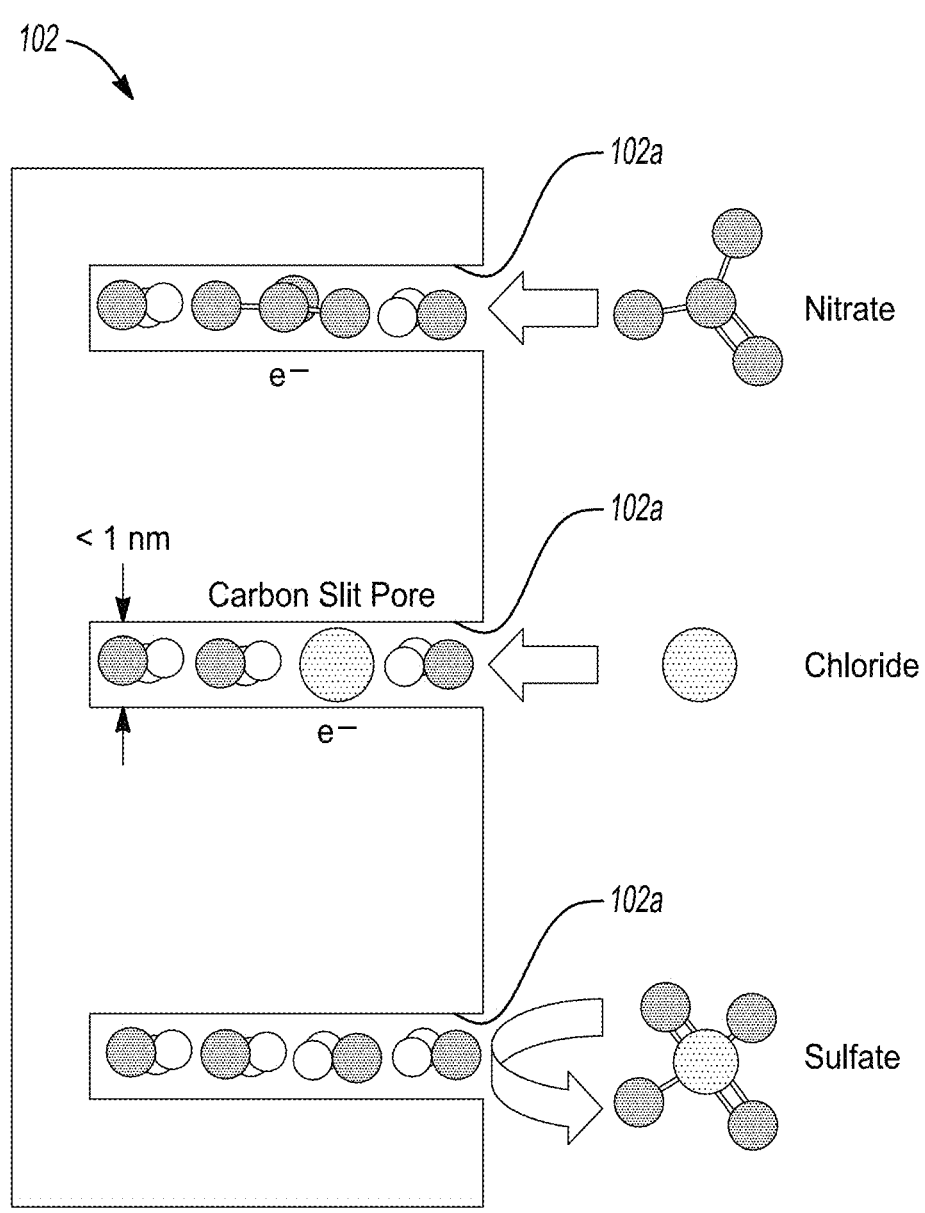
FIG. 2 is a simplified high level illustration showing a portion of one of the electrodes in FIG. 1 to illustrate how the nitrate molecule fits within one of the ultramicropores, while a chloride molecule and sulfate molecule do not fit stably in the ultramicropore.
Figures 3A, 3B:
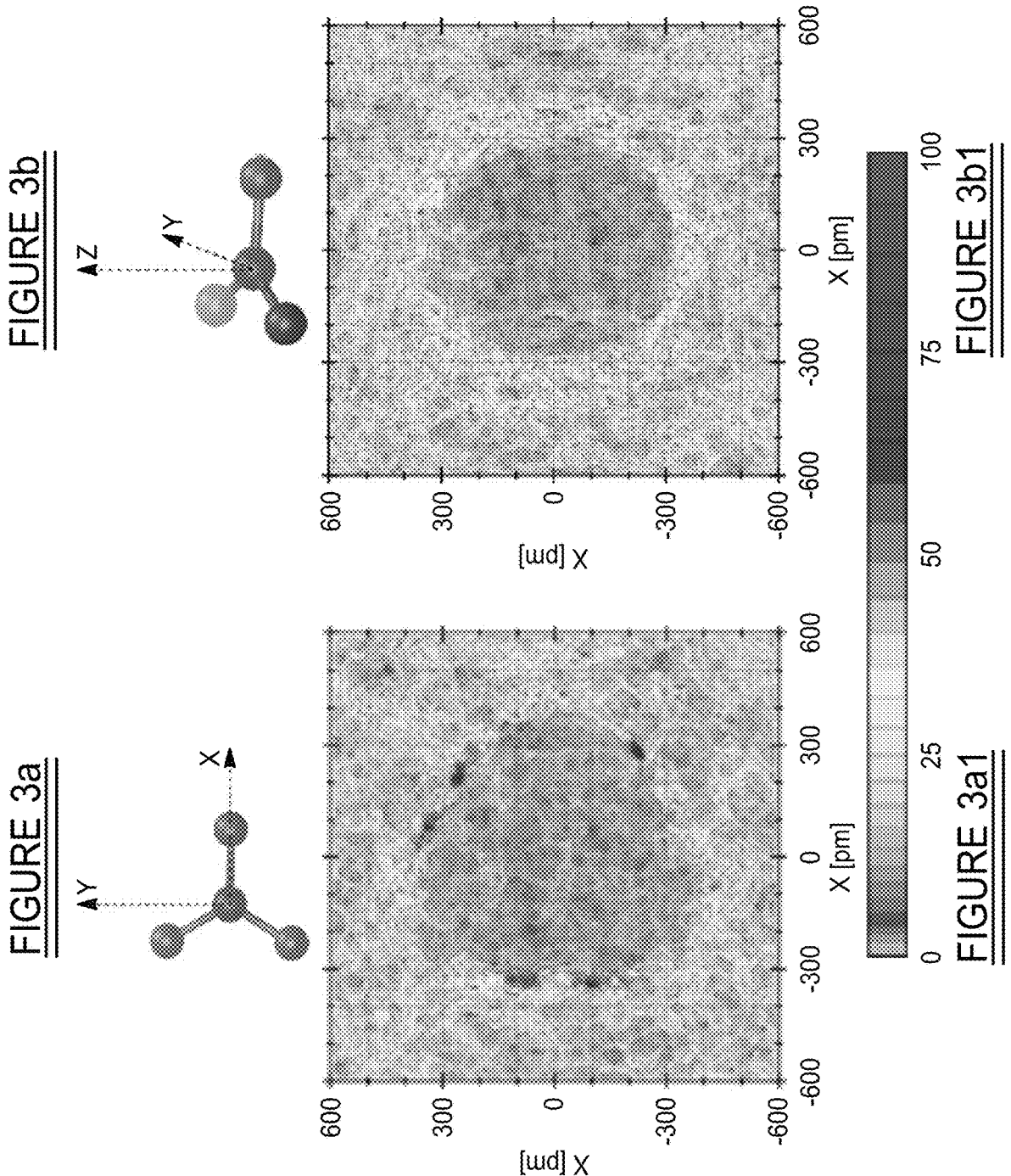

The ultramicropores 102*a* of the electrodes 102 and 104 are a highly important feature which enables the system 100 to selectively remove nitrate over other ions, especially common divalent species. The reason for this is that the ultramicropores 102*a* formed in the electrodes 102/104 (e.g., carbon aerogel) tend to have slit-shaped pores, as shown in highly simplified form in FIG. 2, and that nitrate is a weakly solvated disk-like ion (FIGS. 3*a* and 3*b*), making it the perfect lock-and-key situation for selective adsorption (FIG. 2). FIGS. 3*a* and 3*b* illustrate the nitrate ion, with FIG. 3*b* illustrating particularly well the disc-like shape that this ion has. The disc-like shape enables the nitrate ion to be easily captured in the slit-shaped ultramicropores 102*a*. FIGS. 3*a*1 and 3*b*2 show graphs which illustrate the projection distribution of water oxygens on the planes parallel (FIG. 3*a*1) and perpendicular (FIG. 3*b*1) to the plane of the anion. In the graphs of FIGS. 3*a*1 and 3*b*1, red=oxygen, white/grey=hydrogen and blue=nitrogen.

Figure 4:
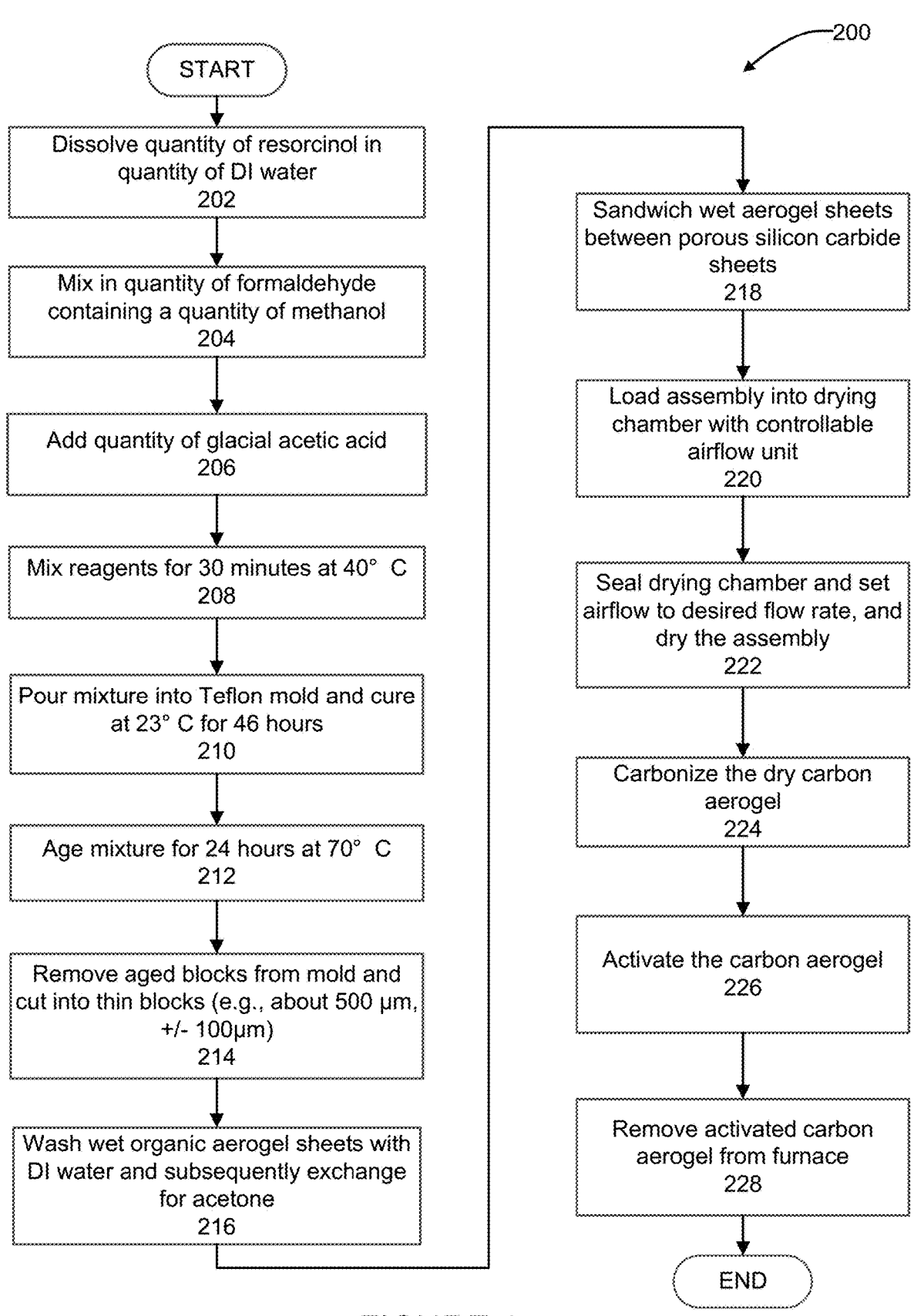
FIG. 4 is a high level flowchart summarizing various operations that may be performed in forming the electrodes shown in FIG. 1.
Figure 4B:
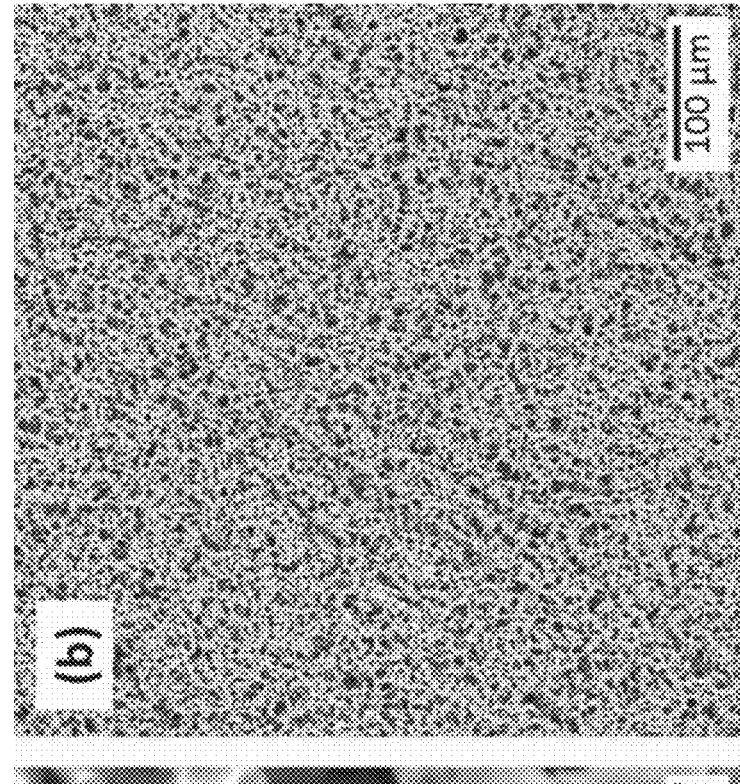
FIGS. 4a and 4b illustrate high and low magnification micrographs, respectively, obtained from a scanning electron microscope showing the electrodes after carbonization and activation.
Figure 4A:
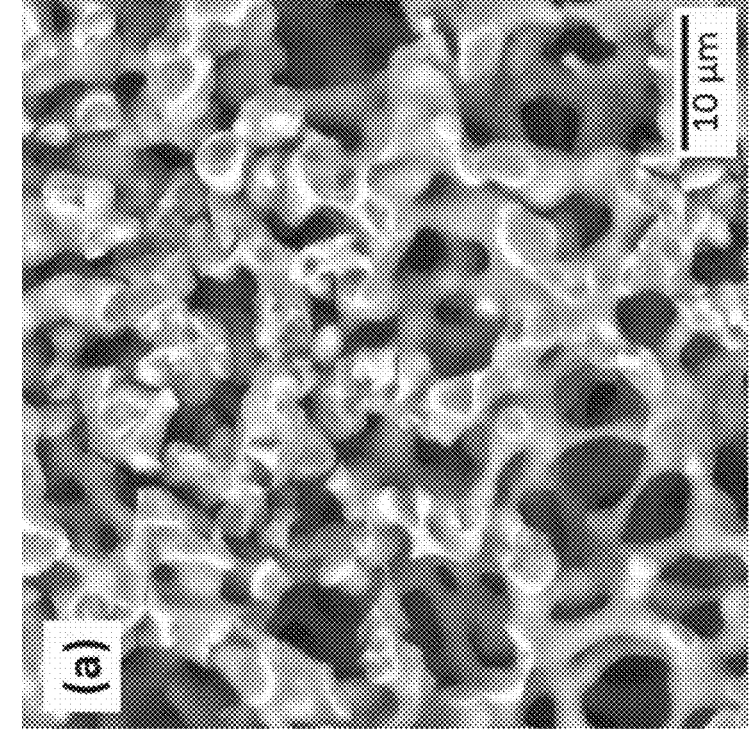

The electrodes 102 and 104 were formed in the same manner, and therefore the following discussion will reference only the forming of the electrode 102. The flowchart 200 of FIG. 4 summarizes various the operations used to make the ultramicroporous hierarchical carbon aerogel monoliths ("μHCAMs") that are used as the electrodes 102 and 104. Initially at operation 202 a quantity of 430.5 g of resorcinol (3.92 mol, 99% Sigma Aldrich) was dissolved in 525.0 g of DI water. At operation 204 a quantity of 626.5 g of 37% formaldehyde solution (7.84 mol, ACS grade, contains 10% MeOFl, Sigma Aldrich) was then added. At operation 206 a quantity of 15.4 g of glacial acetic acid (0.245 mol, 99+% Sigma Aldrich) was then also added. At operation 208 the reagents were mixed for 30 min at 40° C. At operation 210 the mixture was then poured into a Teflon mold and cured at 23° C. for 46 hours, followed at operation 212 by aging for 24 hours at 70° C. The aged RF blocks were then removed from the mold and sliced into thin sheets having a thickness of from about 300 μm to about 700 μm, and in one instance a thickness of about 500 μm. The sheets were formed by slicing the aged RF blocks with a suitable implement, for example a band saw (e.g., Delta Model 28-185), as indicated at operation 214. The wet organic aerogel sheets were washed with DI water and subsequently exchanged for acetone, as indicated at operation 216. Wet aerogel sheets were then sandwiched between porous silicon carbide sheets, as indicated at operation 218, and then loaded into a custom-made drying chamber equipped with an airflow control unit, as indicated at operation 220. After loading, the drying chamber was sealed, and the air flow rate set to 80 mL/min, as indicated at operation 222, to dry the aerogel sheets. Dry carbon aerogel were carbonized at about 900° C. to about 1000° C., for about 2 to 4 hours, and in one instance at about 950° C. for 3 hours under $N_2$, as indicated at operation 224, and subsequently activated for about 0.5-1.5 hours at a temperature of about 900° C. to about 1000° C., and in one instance for 1 hour at 950° C., with $CO_2$ flow at 2 L/min in a 6 inch tube furnace, as indicated at operation 226. At operation 228 the activated carbon aerogel was then removed from the furnace and the process ends. FIGS. 4a and 4b illustrate high and low magnification micrographs, respectively, obtained from a scanning electron microscope showing a portion of the ultramicroporous electrode 102 after carbonization and activation.

Figures 5, 6:
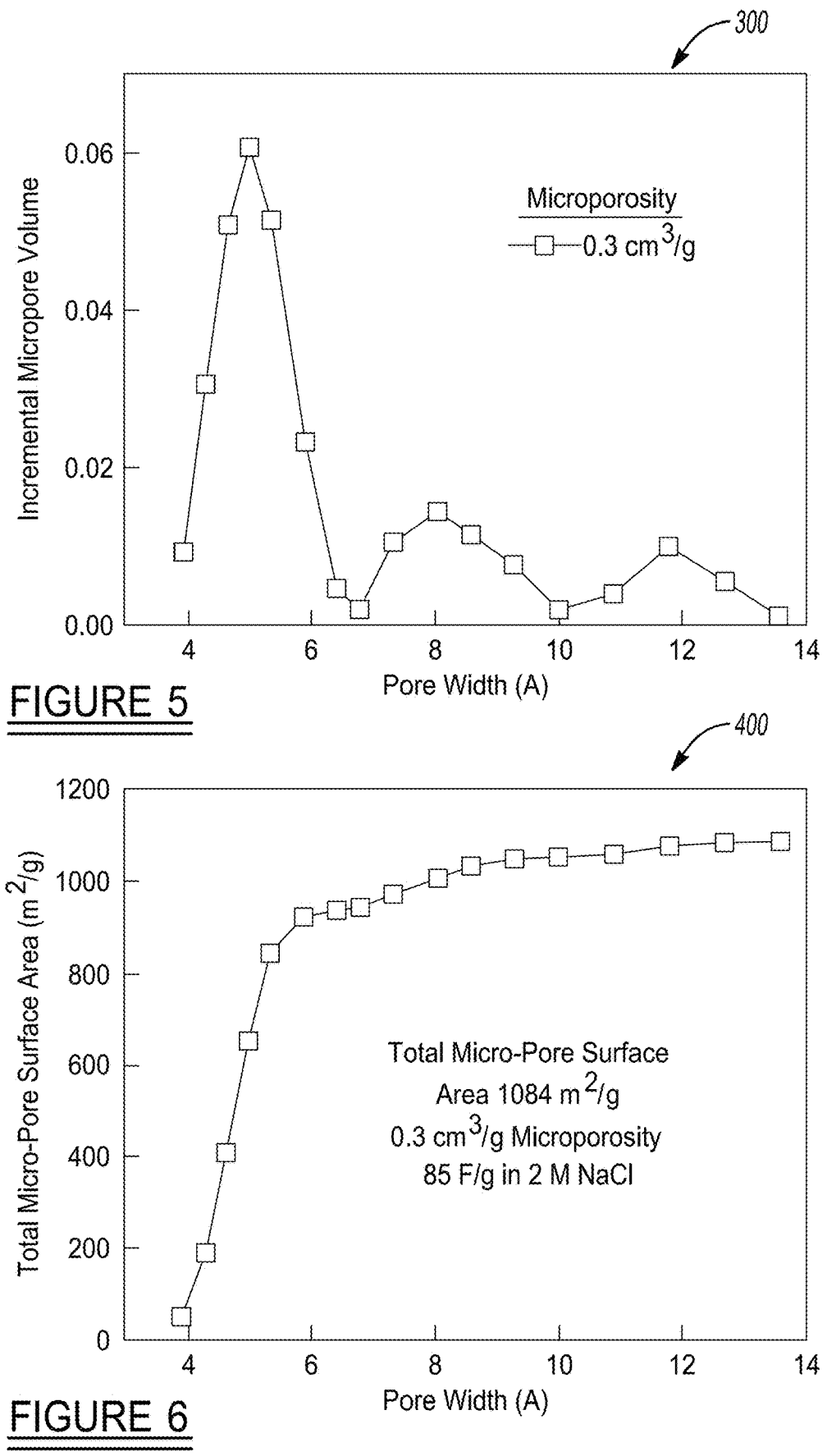
FIG. 5 is a graph showing measurements of the micro-pore 20 size distribution from $N_2$ adsorption measurements of the micro-pores formed in a carbon aerogel electrode of the present disclosure, and more particularly showing micro-pore size distribution as a function of slit pore width.
FIG. 6 is a graph created using $N_2$ adsorption measurements of the micro-pores of the carbon aerogel of the present disclosure, showing cumulative micro-pore volume as a function of slit pore width.

It is important to note that the resulting aerogel is activated to have the ~0.3 $cm^3$/g microporosity with pore sizes almost all being below 1 nm in width. FIG. 5 is a graph 300 showing measurements of the micro-pore size distribution from $N_2$ adsorption measurements of the micro-pores formed in a carbon aerogel electrode of the present disclosure, and more particularly showing micro-pore size distribution as a function of slit pore width. FIG. 6 shows a graph 400 illustrating cumulative micro-pore area as a function of slit pore width. It is this micro-pore size distribution that is highly important to making the electrodes 102 and 104 selective for nitrate. Nitrate, being a planar, weakly solvated ion, is ideal for fitting into the narrow ultramicropores 102a where other ions either cannot fit or are less energetically stable within. This pore size distribution is extremely effective in adsorbing nitrate over both a divalent species and a common interferant ion like chloride.

Figures 7, 8:
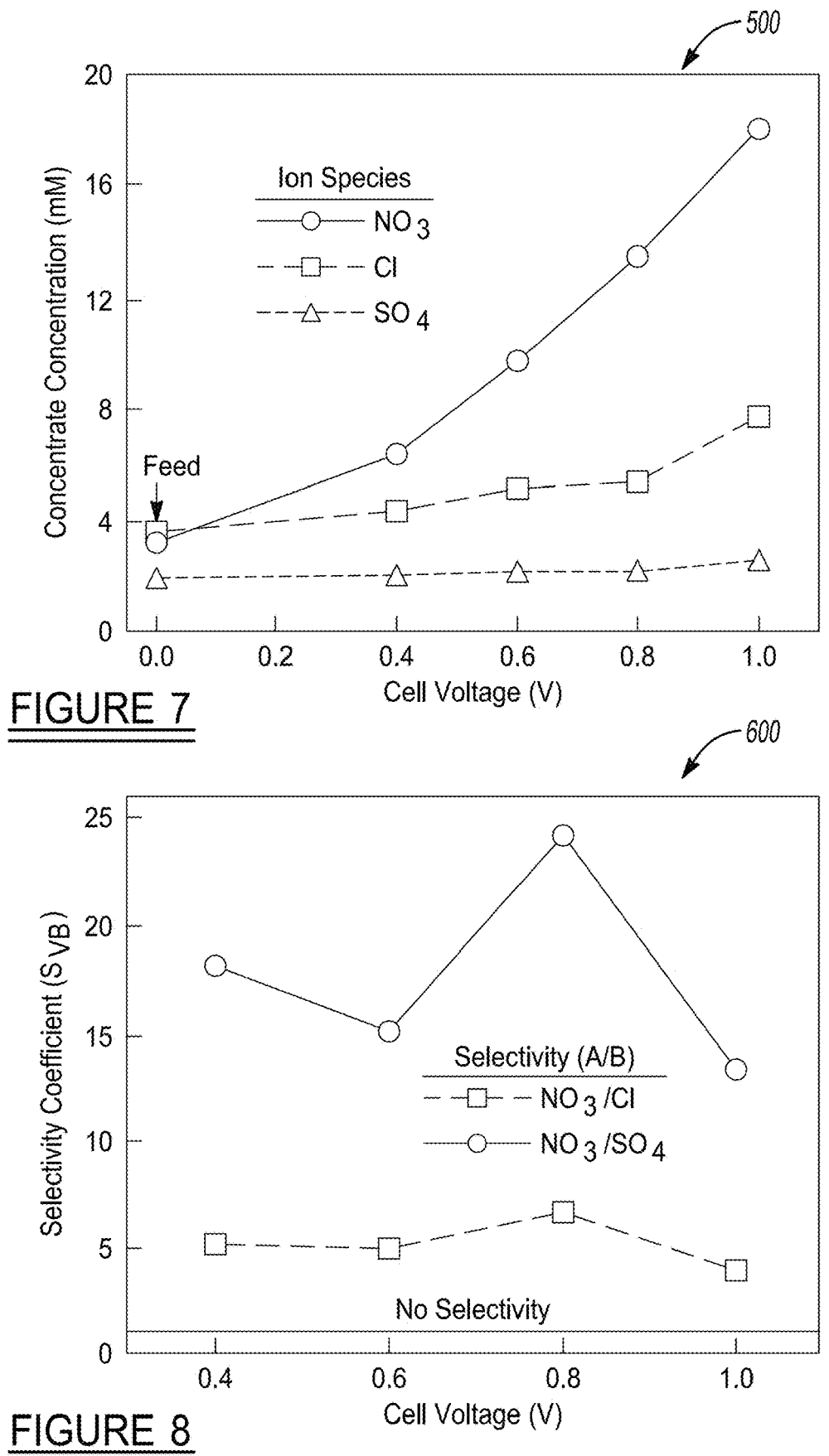
FIG. 7 shows a graph of electrosorption of the carbon aerogel of the present disclosure illustrating the concentrate collected at different charge voltages applied to the cell, for each of ion species $NO_3$, Cl and $SO_4$.
FIG. 8 is a graph showing calculated nitrate/chloride and nitrate/sulfate selectivities from the results of FIG. 7.

The electrosorption selectivity of the activated aerogel electrode 102 described above was measured in a flow-through electrode GDI cell, the results of which are shown in FIGS. 7 and 8. To do so, a 3.33 mM/3.33 mM/1.67 mM $NaCl/NaNO_3/Na_2SO_4$ feed solution were used. The GDI cell was charged at various constant voltages (0.4-1 V) under a constant flow rate (3 ml/min) while monitoring the effluent conductivity. After charging the GDI cell at constant voltage and flow for an extended period of time (>25 min), the GDI cell was discharged to zero volts, and then the resulting concentrate was collected, stopping once the GDI cell current density decayed to a low value (0.045 $mA/cm^2$). With the concentrate solution in hand, it was then possible to measure the ion concentration ratios that were adsorbed onto the electrodes during the charging phase with ion chromatography. FIG. 7 presents a graph 500 illustrating the resulting raw concentration values of nitrate, chloride, and sulfate in the collected concentrate solution. By far, the dominant adsorbed species was nitrate, followed by chloride, and then lastly by sulfate ($NO_3^->Cl^->>SO_4^{2-}$). The sulfate concentration scarcely deviated from the feed (FIG. 7), indicating that it was essentially not adsorbed. These results indicate that ultramicroporous carbon can be used as a highly selective sorbent for nitrate and perhaps other weakly solvated planar ions, even in the presence of divalent ions.

FIG. 8 shows a graph 600 which illustrates that the observed nitrate selectivities are exceptionally high when compared to other GDI research, especially given that a divalent ion (sulfate) is present in addition to chloride. Most importantly, these results are obtained without the need for specialized functionalization, membranes, or coatings. Still further, these results are produced using a relevant mixture with multivalent and chloride interferants. This shows that the carbon aerogel electrodes 102 and 104 described herein are ideally suited for selectively removing nitrate from ion mixtures due to an excellent match between pore structure (narrow slits, mostly below 1 nm in width) and ion solvation properties (i.e., nitrate is a weakly solvated in the axial direction). The present disclosure also shows that a particular carbon electrode microporosity can be a highly effective way to achieve excellent electrosorptive selectivity.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "about," when applied to the value for a parameter of a composition or method of this technology, indicates that the calculation or the measurement of the value allows some slight imprecision, resulting (for example) from manufacturing variability, without having a substantial effect on the chemical or physical attributes of the composition or method. If, for some reason, the imprecision provided by "about" is not otherwise understood in the art with this ordinary meaning, then "about" as used herein indicates a possible variation of up to 5% in the value.

What is claimed is:

1. A method for making a carbon aerogel electrode material having slit-shaped pores forming first pores, and a plurality of second pores, the method comprising:

making a wet organic sol-gel block;

slicing the wet organic sol-gel block into sheets each having a thickness of about 300 μm to about 700 μm, to form wet sol-gel sheets;

washing the wet sol-gel sheets with DI water and subsequently exchanged for acetone;

sandwich wet sol-gel sheets between porous silicon carbide sheets, to create a sol-gel form;

drying the sol-gel form to form a dried sol-gel form;

carbonizing the dried sol-gel form at a temperature of from about 900° C. to about 1000° C., for from about 2 hours to about 4 hours;

activating the carbonized sol-gel under carbon dioxide flow, for from about 0.5 hour to about 1.5 hours, at from about 900° C. to about 1000° C., while being exposed to a $CO_2$ flow of about 2 liters per minute in a furnace; and wherein the slit-shaped pores are below 1 nm in width, and the plurality of second pores form micron-sized pores, and wherein the second pores help to form a ligament-like structure having a plurality of ligaments formed with a random distribution throughout a thickness of the carbon aerogel electrode material, and the slit-shaped pores are present on the ligaments.

2. The method of claim 1, wherein the wet organic sol-gel form is a resorcinol-formaldehyde sol-gel.

3. The method of claim 2, wherein the making a wet organic sol-gel form comprises:

making an aqueous solution of resorcinol and formaldehyde;

mixing the aqueous solution with an alcohol and an acid to make a sol-gel precursor;

curing the sol-gel precursor in a mold; and aging the sol-gel.

4. The method of claim 1, wherein the carbonizing is conducted under nitrogen.

* * * * *